March 17, 1959 J. G. BIRRELL 2,877,594
INTERCHANGEABLE FISHING FLOAT AND SINKER
Filed Nov. 20, 1956 2 Sheets-Sheet 1
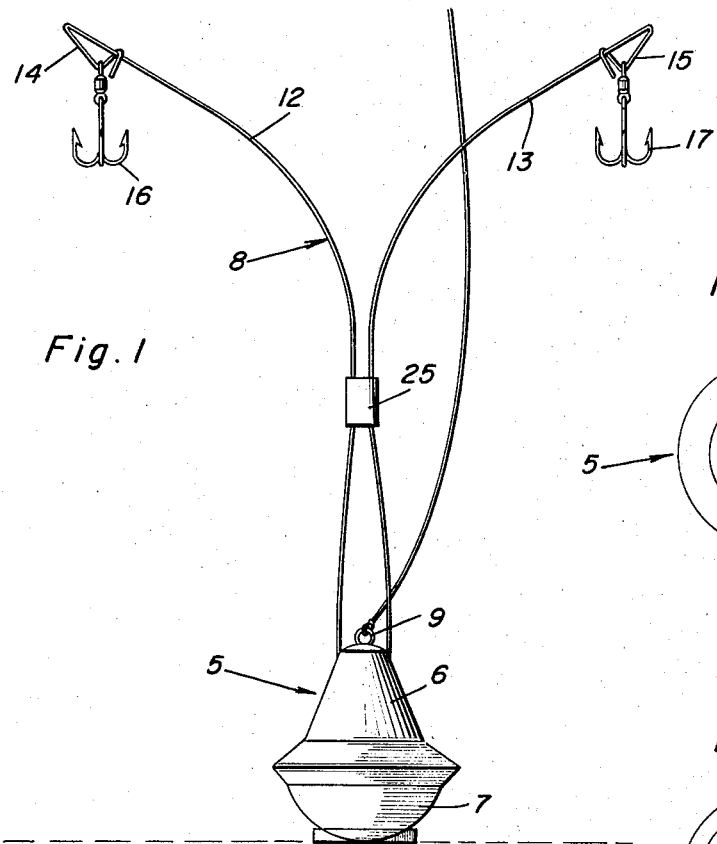
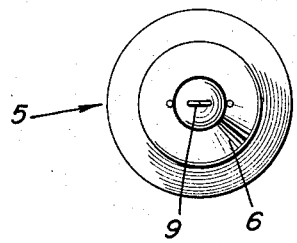
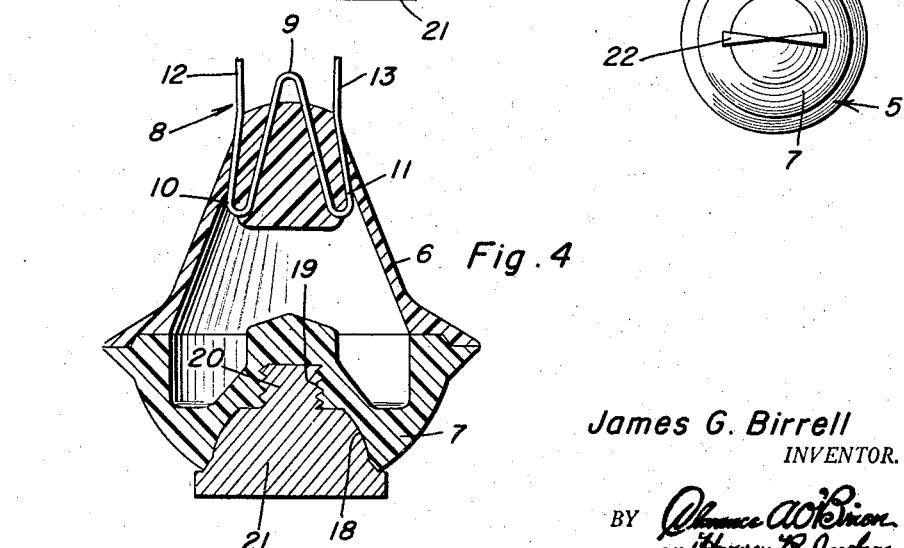
James G. Birrell
INVENTOR.

March 17, 1959   J. G. BIRRELL   2,877,594
INTERCHANGEABLE FISHING FLOAT AND SINKER
Filed Nov. 20, 1956   2 Sheets-Sheet 2
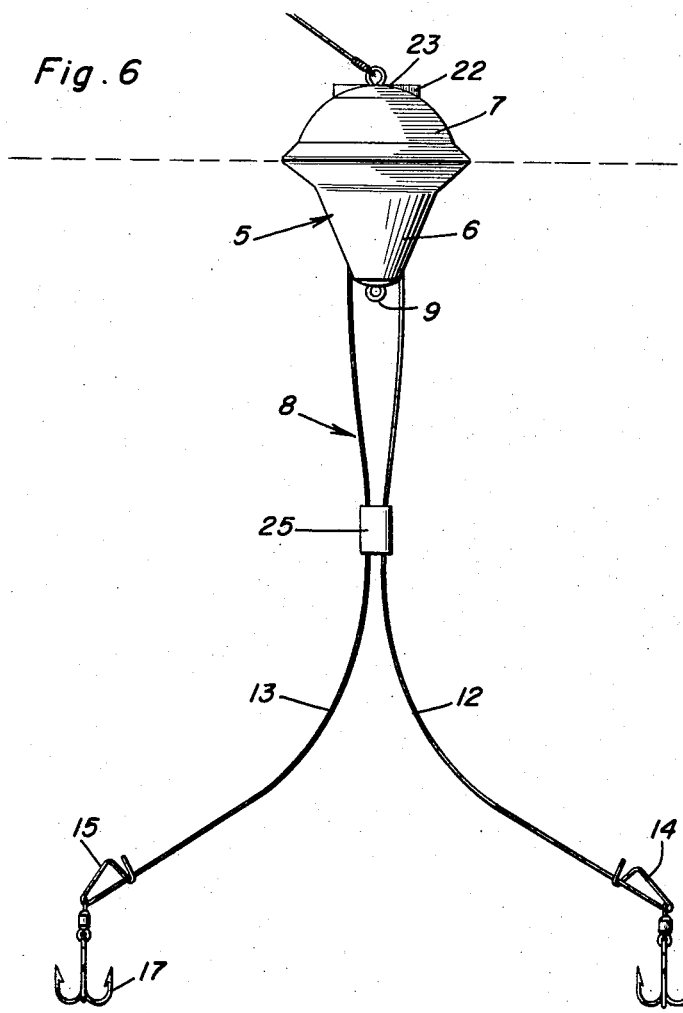
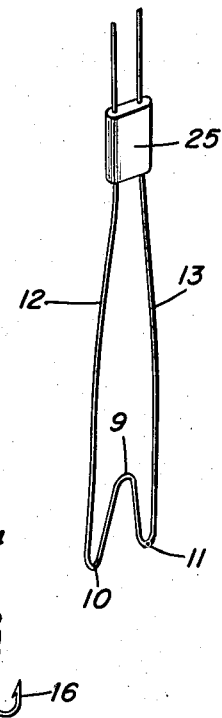
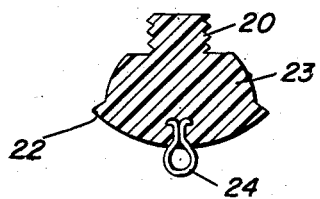
James G. Birrell
INVENTOR.

United States Patent Office 2,877,594
Patented Mar. 17, 1959

2,877,594

INTERCHANGEABLE FISHING FLOAT AND SINKER

James G. Birrell, Houston, Tex.

Application November 20, 1956, Serial No. 623,339

2 Claims. (Cl. 43—42.74)

The present invention relates to new and useful improvements in fishing devices and more particularly to a fishing float which may be converted into a sinker for fishing at different depths.

An important object of the invention is to construct a buoyant hollow body adapted to float on the surface of the water for use as a fishing float and to which a fish hook spreader is attached for fishing close to the surface and providing means for interchangeably attaching weights to the body for soft water, fresh water or swift current fishing respectively.

Another object is to provide a fishing device of this character of simple and practical construction which is efficient and reliable in use, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view showing the combined float and sinker resting on the bottom;

Figure 2 is a top plan view thereof;

Figure 3 is a bottom plan view thereof;

Figure 4 is an enlarged vertical sectional view taken on a line 4—4 of Figure 2;

Figure 5 is a vertical sectional view of a modified interchangeable weighted adapter;

Figure 6 is a side elevational view showing the device in use as a float; and

Figure 7 is an enlarged fragmentary perspective view of the clip for the spreader.

Referring now to the drawings in detail, wherein for the purpose of illustration I have disclosed a preferred embodiment of my invention, the numeral 5 designates a hollow, buoyant body generally and which is constructed of a substantially bell-shaped upper section 6 to the bottom of which a bottom section 7 is cemented or otherwise suitably secured to close the bottom of the body. The sections 6 and 7 of the body may be constructed of plastic, wood or other suitable lightweight material.

A wire fish hook spreader 8 is formed at its central portion with an eye 9, and adjacent to which a pair of loops 10 and 11 are formed which are embedded in the top of the upper section 6, with the eye 9 projecting above the upper section for attaching a fish line thereto. Resilient wire arms 12 and 13 extend outwardly from the loops 10 and 11 at diametrically opposite sides of the body 5 and are provided with catches 14 and 15 at their outer ends for attaching fish hooks 16 and 17 thereto.

The bottom section 7 is formed at its underside with a conical recess 18 at the apex of which is an internally threaded bore 19 to receive a threaded stem 20 at the apex of a selected conical adapter comformably fitted in the recess 18. Wings 22 are formed on the outer surface of each adapter to provide finger grips to facilitate threading the adapter into the bottom section 7 or for removing the adapter therefrom.

A weighted adapter 21 is shown in Figure 4 for interchangeably attaching to the bottom section 7 and is provided with sufficient mass to cause the body 5 to sink below the surface of the water, as shown in Fig. 1.

When the buoyant adapter 23 is attached to the body 5, the weight of the spreader 8 will cause the body to assume an inverted position and will float on the surface of the water, as shown in Figure 6, and with the hooks on the spreader supported below but near the surface. Clip 25 is attached to the arms of the spreader in a position to keep the hooks separated from each other. In addition, clip 25 keeps the spreader arms upright (Figure 1) to hold the hooks above the bottom and also to keep the arms from breaking off at the body.

When it is desired to fish below the surface of the water, the buoyant adapter 23 having fish line eye 24 is removed and the weighted adapter 21 attached to the body 5. The operation is as follows: For fresh water fishing the lighter adapter 23 is used, this making the float sink slowly. Now the fisherman makes his cast. As soon as the float hits the water, the fisherman counts slowly, for instance to five. The time limit required for the float to sink approximately three feet is assumed to be at a count of five. To keep the float at the three foot depth, the fisherman works his line with a slight jerk, otherwise the float will sink lower than the water. To fish at a deeper depth, the fisherman allows a longer count and then repeats the same procedure as above.

For fishing in salt water the heavier adapter 21 is used with the same procedure as for fresh water fishing. For fishing in water with a strong current, a heavier adapter is selected, this allowing the float to sink deeper into the water.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fishing device comprising a normally buoyant body having a tapering first end, said body adapted to assume a position in water such that said tapered end projects upwardly, a wire fish hook spreader having its central portion embedded in said end of the body, said spreader including an eye projecting above the body for attaching a fishing line thereto, said spreader further including a pair of arms projecting upwardly and outwardly at the sides of the body and adapted for attaching fish hooks thereto, and a weighted adapter detachably secured to the opposite end of the body to change the buoyancy of the adapter and body.

2. A fishing device comprising a normally buoyant body having a tapering upper end, said body adapted to assume a position in water such that said tapered end projects upwardly, a wire fish hook spreader having its central portion embedded in the top of the body, said spreader including an eye projecting above the body for attaching a fishing line thereto, and said spreader further including a pair of arms projecting outwardly at the sides of the body and adapted for attaching fish hooks thereto, said body having a conical recess in its bottom and an internally threaded bore at the apex of the recess, and a weighted adapter conformably fitted in the recess and having a threaded stem secured in the bore to alter buoyancy of the body and adapter.

References Cited in the file of this patent

UNITED STATES PATENTS

| | | |
|---|---|---|
| 2,157,003 | Mussina | May 2, 1939 |
| 2,462,290 | Sauvey | Feb. 22, 1949 |
| 2,605,576 | Young et al. | Aug. 5, 1952 |
| 2,769,270 | Williams | Nov. 6, 1956 |

FOREIGN PATENTS

| | | |
|---|---|---|
| 475,781 | Canada | Aug. 7, 1951 |